(12) United States Patent
Miyao et al.

(10) Patent No.: US 11,656,469 B2
(45) Date of Patent: May 23, 2023

(54) LIGHT-GUIDING DEVICE, VIRTUAL IMAGE DISPLAY APPARATUS, AND METHOD FOR MANUFACTURING LIGHT-GUIDING DEVICE

(71) Applicant: SEIKO EPSON CORPORATION, Tokyo (JP)

(72) Inventors: Toshiaki Miyao, Matsumoto (JP); Masayuki Takagi, Azumino (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/474,333

(22) Filed: Sep. 14, 2021

(65) Prior Publication Data
US 2021/0405377 A1 Dec. 30, 2021

Related U.S. Application Data

(62) Division of application No. 16/699,174, filed on Nov. 29, 2019, now Pat. No. 11,150,477.

(30) Foreign Application Priority Data

Nov. 30, 2018 (JP) .............................. JP2018-224621

(51) Int. Cl.
*G02B 27/01* (2006.01)
*F21V 8/00* (2006.01)

(52) U.S. Cl.
CPC ......... *G02B 27/0172* (2013.01); *G02B 6/003* (2013.01); *G02B 6/0035* (2013.01); *G02B 6/0065* (2013.01); *G02B 2027/0178* (2013.01)

(58) Field of Classification Search
None
See application file for complete search history.

(56) References Cited

U.S. PATENT DOCUMENTS

| 6,882,479 B2 | 4/2005 | Song et al. |
| 2005/0174651 A1 | 8/2005 | Spitzer et al. |
| 2007/0188837 A1 | 8/2007 | Shimizu et al. |

(Continued)

FOREIGN PATENT DOCUMENTS

| JP | 2013225042 A | 10/2013 |
| JP | 2017-111363 A | 6/2017 |

OTHER PUBLICATIONS

Jun. 30, 2021 Notice of Allowance issued in U.S. Appl. No. 16/699,174.
Mar. 15, 2021 Office Action issued in U.S. Appl. No. 16/699,174.

*Primary Examiner* — Michelle R Connelly
(74) *Attorney, Agent, or Firm* — Oliff PLC

(57) ABSTRACT

A light-guiding device includes a pair of light-guiding portions, a pair of light-incident portions that causes image light to be incident on the pair of light-guiding portions respectively, and a pair of light-emitting portions that emit image light, guided by the pair of light-guiding portions, to outside respectively, in which a pair of optical members including the pair of light-guiding portions are coupled by a central member having light transmissivity, and separate overcoat layers are provided at the optical member on one side and at the optical member on another side with respect to an approximate center of the central member.

8 Claims, 14 Drawing Sheets

(56) References Cited

U.S. PATENT DOCUMENTS

| | | |
|---|---|---|
| 2013/0222896 A1 | 8/2013 | Komatsu et al. |
| 2017/0180685 A1 | 6/2017 | Takagi et al. |
| 2017/0184854 A1* | 6/2017 | Takagi ............... G02B 27/0172 |
| 2017/0184855 A1 | 6/2017 | Takagi et al. |
| 2018/0081176 A1* | 3/2018 | Olkkonen .......... G02B 27/0172 |
| 2018/0292599 A1* | 10/2018 | Ofir .................... G02B 27/0081 |

* cited by examiner

LIGHT-GUIDING DEVICE, VIRTUAL IMAGE DISPLAY APPARATUS, AND METHOD FOR MANUFACTURING LIGHT-GUIDING DEVICE

CROSS-REFERENCE TO RELATED APPLICATION(S)

This application is a divisional of U.S. application Ser. No. 16/699,174 filed Nov. 29, 2019, which is based on, and claims priority from JP Application Serial Number 2018-224621, filed Nov. 30, 2018. The contents of the above applications are incorporated herein by reference.

BACKGROUND

1. Technical Field

The present disclosure relates to a virtual image display apparatus and a method for manufacturing a light-guiding device that present a virtual image to an observer, and particularly relates to a light-guiding device that enables see-through viewing.

2. Related Art

As a light-guiding device that enables see-through viewing, a device is known which includes a pair of light-guiding members each provided with a light-guiding portion, a light-incident portion, and a light-emitting portion, where the right and left light-guiding members are coupled by a light transmission member located at the center to configure a single light-guiding device (FIG. 10 of JP 2017-111363 A). Note that, as a method for manufacturing the light-guiding device, a hard coat layer may occasionally be formed by dip processing on a surface of a resin base material.

However, in a structure in which the right and left light-guiding members are coupled by the light transmission member located at the center as in JP 2017-111363 A, there are several issues to be resolved at the time when forming of the hard coat layer. That is, when attempting to form a hard coat layer with the resin base material being in a landscape-oriented state, the surface when leaving the liquid becomes larger, causing an occurrence of liquid pooling at the under-portion to lead to a whitening with high probability, and the poor appearance results in a decrease in yield. On the other hand, when attempting to form the hard coat layer with the resin base material being in a portrait-oriented state, causing a concentration of the hard coat liquid at the throttle portion to lead to an occurrence of sagging near the center portion, and resulting in poor appearance and a decrease in yield. In addition, when steps are provided at the light-guiding member or the like, the orientation of a pair of corresponding steps is reversed in a pair of light-guiding members due to the shape symmetry of the light-guiding device when pulling up the light-guiding members from a coating solution, causing a whitening of the hard coat layer or an increase of non-uniformity in thickness, around the step of either one of the light-guiding members.

SUMMARY

A light-guiding device according to an aspect of the present disclosure is the light-guiding device including a pair of light-guiding portions, a pair of light-incident portions configured to cause image light to be incident on the pair of light-guiding portions respectively, and a pair of light-emitting portions configured to emit image light, guided by the pair of light-guiding portions, to outside respectively, in which a pair of optical members including the pair of light-guiding portions are coupled by a central member, and separate overcoat layers are provided at the optical member on one side and at the optical member on another side with respect to an approximate center of the central member.

DESCRIPTION OF EXEMPLARY EMBODIMENTS

First Embodiment

Hereinafter, a virtual image display apparatus according to a first embodiment of the present disclosure will be described below with reference to FIG. 1 and the like.

Figure 1:
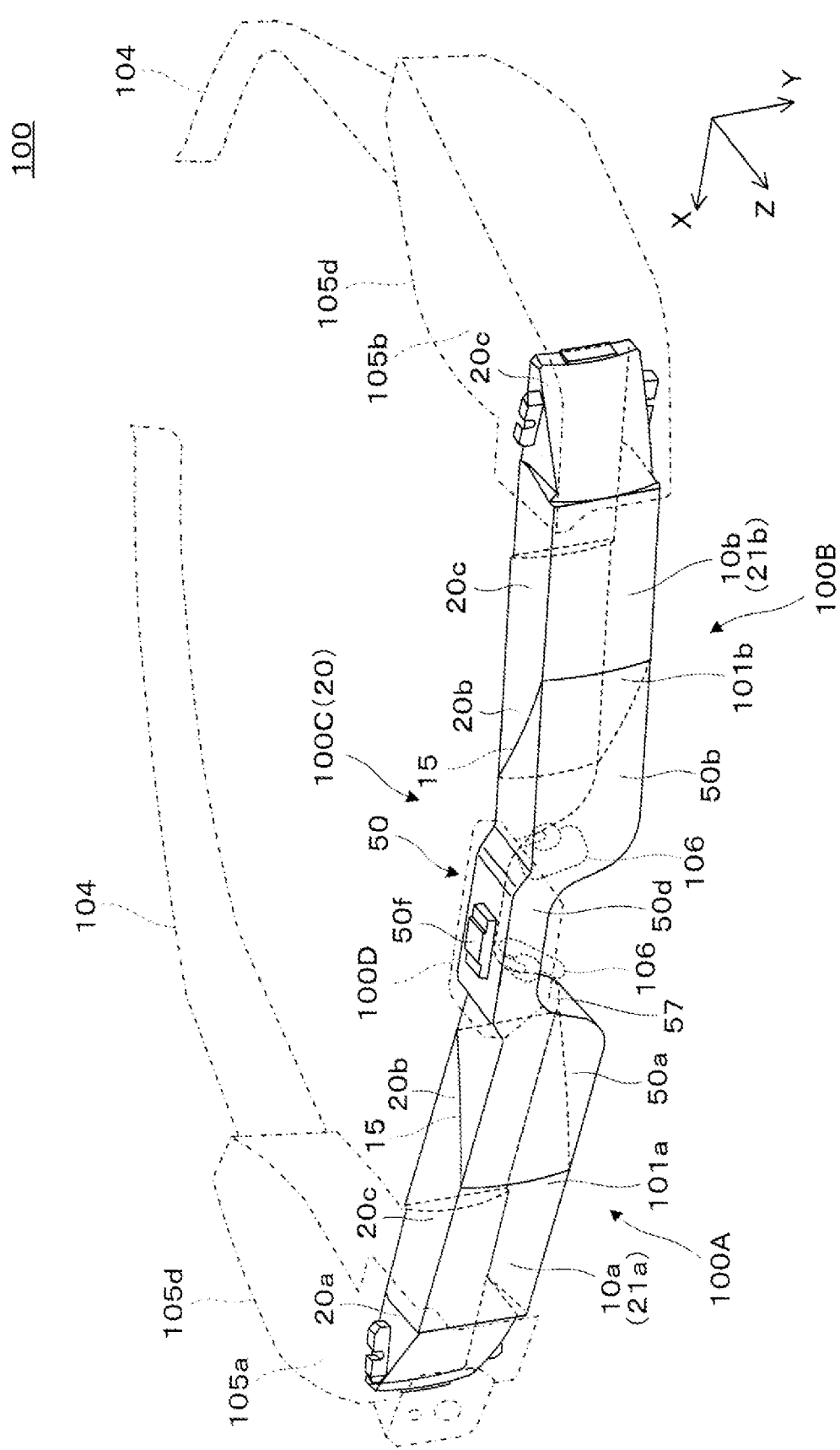
FIG. 1 is an explanatory cross-sectional view illustrating a virtual image display apparatus including a light-guiding device according to a first embodiment.

As illustrated in FIG. 1, a virtual image display apparatus 100 according to the first embodiment, which is a head-mounted display (HMD) having an eyeglass-like appearance, can allow an observer or user wearing the virtual image display apparatus 100 to visually recognize image light or video light due to virtual image, as well as can allow the observer to observe an external image in a see-through manner. The virtual image display apparatus 100 includes a first display device 100A and a second display device 100B. In FIGS. 1, X, Y, and Z are an orthogonal coordinate system, where the ±X directions correspond to a lateral direction in which both eyes of an observer wearing the virtual image display apparatus 100 are aligned, the Y direction corresponds to a downward direction orthogonal to the lateral direction in which the both eyes of the observer are aligned, and the Z direction corresponds to a front direction or a front surface direction of the observer.

The first display device 100A and the second display device 100B are parts that form a virtual image for the right eye and a virtual image for the left eye, respectively. The first display device 100A for the right eye includes a first virtual image forming optical portion 101a that covers the front of an eye of the observer in a see-through manner, and a first image forming body 105a that generates image light. The second display device 100B for the left eye includes a second virtual image forming optical portion 101b that covers the front of an eye of the observer in a see-through manner, and a second image forming body 105b that generates image light. The first and second image forming bodies 105a and 105b are each constituted by optical elements (not illustrated) such as a video forming device, a projection lens, and the like, and a member that houses these optical elements, and the like. Note that the optical elements in the first and second image forming bodies 105a and 105b are covered by case members 105d in a cover-like form and supported within the case members 105d. The first and second virtual image forming optical portions 101a and 101b each cause image light generated by the first and second image forming bodies 105a and 105b to be guided and superimposes the external light with the image light to be visually recognized. The first and second virtual image forming optical portions 101a and 101b form a see-through light-guiding unit 100C being a unitary member coupled together at the center rather than separate members. The see-through light-guiding unit 100C, which is a light-guiding device 20 of a composite type that provides visual images for both eyes to an observer by means of guided light, is supported by the case members 105d in a cover-like form at the both ends.

The first and second image forming bodies 105a and 105b are attached with temples 104 being trailing portions extending rearward at the rear portions pivotally by non-illustrated hinges, where the temples 104 function as support portions that are caused to abut against the ears, temple, and the like of an observer to ensure a wearing state. A center cover 100D covering the center portion of the see-through light-guiding unit 100C is fixed between the first and second virtual image forming optical portions 101a and 101b, that is, at the center in the ±X directions of the see-through light-guiding unit 100C. The center cover 100D supports a pair of nose pads 106 and 106. The nose pads 106 and 106, which constitute the support portions together with the temples 104, are caused to abut against the nose of the observer to enable positioning of the see-through light-guiding unit 100C and the like relative to the eyes of the observer.

Figure 2:
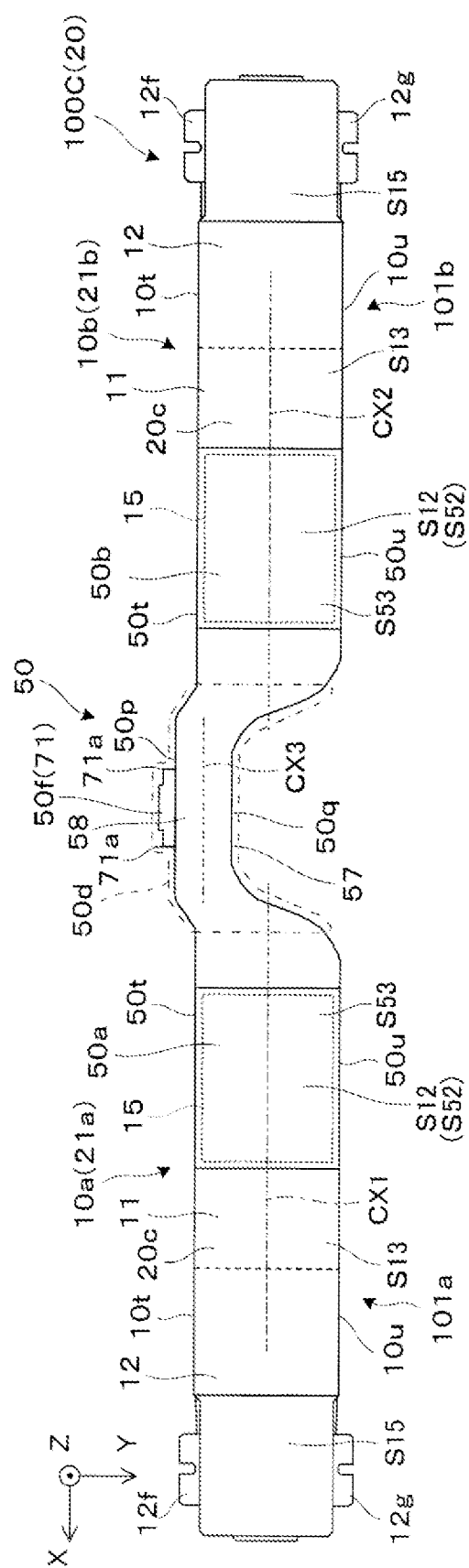
FIG. 2 is a front view of a light-guiding device.
Figure 3:
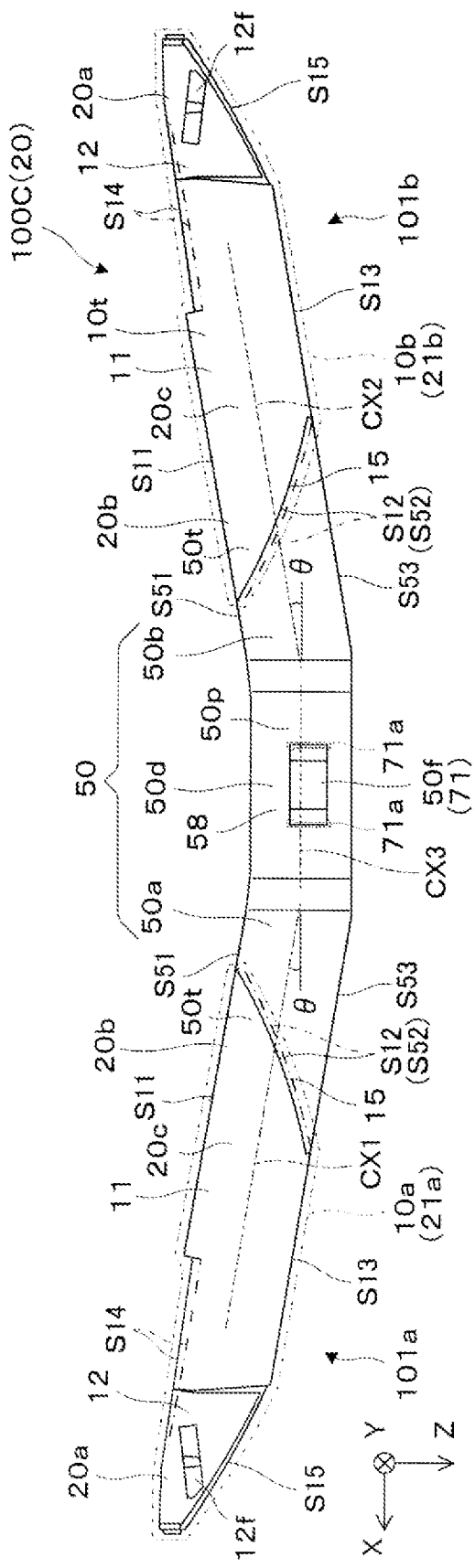
FIG. 3 is a plan view of a light-guiding device.

A structure of the see-through light-guiding unit 100C, that is, the light-guiding device 20 will be described below with reference to FIGS. 2 and 3.

The see-through light-guiding unit 100C includes a pair of light-guiding members 10a and 10b and a central member 50. The pair of light-guiding members 10a and 10b are a pair of optical members 21a and 21b that contribute to virtual image formation along with propagating image light inside therethrough. The pair of light-guiding members 10a and 10b, that are, the pair of optical members 21a and 21b, are fixed to the respective both ends of the central member 50. The see-through light-guiding unit 100C is provided in a straight line-like or rod-like form, as a whole. The see-through light-guiding unit 100C being within a horizontal XZ plane, while protruding forward with slightly bent at the center of the central member 50, has a symmetrical shape. The light-guiding members 10a and 10b have center axes CX1 and CX2 that form an angle θ relative to a center axis CX3 of the central member 50.

The optical member 21a being the light-guiding member 10a on one hand, which is provided with a light-incident portion 20a at the end portion on the +X side and a light-emitting portion 20b at the end portion on the −X side, includes a structure in which a light-guiding portion 20c extends between the light-incident portion 20a and the light-emitting portion 20b, where the light guiding direction as a whole is a direction approximating the −X direction, and is slightly inclined in the +Z direction. The light-guiding member 10a on one hand is an integrated member, but can be recognized as separated into a first light guiding part 11 on the light exiting side and a second light guiding part 12 on the light incident side. The first light guiding part 11 of the light-guiding member 10a is provided with a first face S11 being a flat plane facing an eye of the observer, and a second face S12 being a curved plane inclined relative to the first face S11 at the boundary with the central member 50, and is provided with a third face S13 being a flat plane facing the first face S11 and extending parallel thereto. The second light guiding part 12 of the light-guiding member 10a is provided with a fourth face S14 being a curved plane facing the third face S13, and a fifth face S15 being a curved plane inclined relative to the fourth face S14. The fifth face S15, which is a plane being non-transmissive of light, is provided with a reflective film RM. In the first light guiding part 11, a half mirror 15 is collaterally provided on the surface of the second face S12 facing the central member 50. The half mirror 15 is a reflective film having light transmissivity (that is, a semi-transmission reflective film), which is formed by film forming a metallic reflective film or a dielectric multi-layer film, and is appropriately set with a reflectivity with respect to the image light. In the first light guiding part 11 of the light-guiding member 10a, a lower surface 10u and an upper surface 10t are flat planes being horizontal and parallel to each other, which extend along the XZ plane. The lower surface 10u and the upper surface 10t are not required to be exactly parallel to the XZ plane, and may have slight inclination or unevenness within a range that does not interfere with an optical path of image light or the like. The light-guiding member 10b or the optical member 21b on the other hand, which is laterally inverted with respect to the light-guiding member 10a or the optical member 21a on one hand, has a structure and shape as in the light-guiding member 10a or the optical member 21a on one hand. Thus, the redundant descriptions thereof will be omitted, denoting the same portions by the same reference signs as in the light-guiding member 10a or the optical member 21a on one hand.

A pair of fastening portions 12f and 12g provided on the upper surface and the lower surface at the side of the light-incident portions 20a disposed on outer end portions of the optical members 21a and 21b serve as parts for aligning and fixing the image forming bodies 105a and 105b with respect to the light-incident portions 20a.

The central member 50 having light transmissivity includes a pair of light transmissive portions 50a and 50b, and a coupling portion 50d. At the light transmissive portion 50a on one hand, a first transmission face S51 being a flat plane facing an eye of the observer is provided, and a third transmission face S53 being a flat plane facing the first transmission face S51 and extending parallel thereto is provided. A second transmission face S52 is disposed between the first transmission face S51 and the third transmission face S53. The first transmission face S51 is on a face extended from the first face S11 of the light-guiding member 10a on one hand, the second transmission face S52 is a curved plane being joined to and integrated with the second face S12 of the light-guiding member 10a on one hand, and the third transmission face S53 is on a face extended from the third face S13 of the light-guiding member 10a on one hand. In other words, the first face S11 and the first transmission face S51 are adjacent to each other, and similarly, the third face S13 and the third transmission face S53 are adjacent to each other, where the respective surfaces are in an aligned state flush with each other to form smooth surfaces. In the light transmissive portion 50a, a lower surface 50u and an upper surface 50t are flat planes being horizontal and parallel to each other, which extend along the XZ plane. The lower surface 50u of the light transmissive portion 50a is disposed parallel to and substantially flush with the lower surface 10u of the light-guiding member 10a. The upper surface 50t of the light transmissive portion 50a is disposed parallel to and flush with the upper surface 10t of the light-guiding member 10a. That is, a part at which the light transmissive portion 50a is coupled to the first light guiding part 11 of the light-guiding member 10a and a periphery of the part have a rectangular cross-section at each of the positions along the center axis CX1. The lower surface 50u and the upper surface 50t are not required to be exactly parallel to the XZ plane, and may have slight inclination or unevenness within a range that does not interfere with an optical path of external light. The light transmissive portion 50b on the other hand, which is laterally inverted with respect to the light transmissive portion 50a on one hand, includes a structure as in the light transmissive portion 50a on the other hand. Thus, the redundant descriptions thereof will be omitted, denoting the same portions by the same reference signs as in the light transmissive portion 50a on one hand. The coupling portion 50d, which includes a portion bent in a bridge shape, includes a notch 57 recessed upward from the lower surface 50u relative to the light transmissive portion 50a and 50b, and includes a protrusion portion 58 that protrudes at the upper side of the upper surface 50t relative to the light transmissive portions 50a and 50b. That is, a lower surface 50q of the coupling portion 50d is disposed at the upper side or the –Y side of the lower surface 50u of the light transmissive portion 50a and the lower surface 10u of the light-guiding member 10a, and an upper surface 50p of the coupling portion 50d is disposed at the upper side or the –Y side of the upper surface 50t of the light transmissive portion 50a and the upper surface 10t of the light-guiding member 10a. A provision of a notch 57 having a depth not less than a predetermined depth not only ensures a space in which the nose is to be disposed, but also prevents image light from the light-guiding member 10a of the first virtual image forming optical portion 101a from being incident on the light-guiding member 10b of the second virtual image forming optical portion 101b through the coupling portion 50d, or vice versa. In addition, the protrusion amount of the protrusion portion 58 is made sufficiently large, to thus prevent the coupling portion 50d from becoming thinner to lower the strength.

A protrusion portion 50f provided at the upper side of the center portion (corresponding to a lateral middle portion 50j illustrated in FIG. 5) of the coupling portion 50d forms a positioning structure 71 that aligns and fixes the center cover 100D illustrated in FIG. 1. In the positioning structure 71, positioning locations 71a are provided at both ends of the lateral direction. A gate may be provided on the top surface of the protrusion portion 50f when molding the central member 50.

Figure 4:
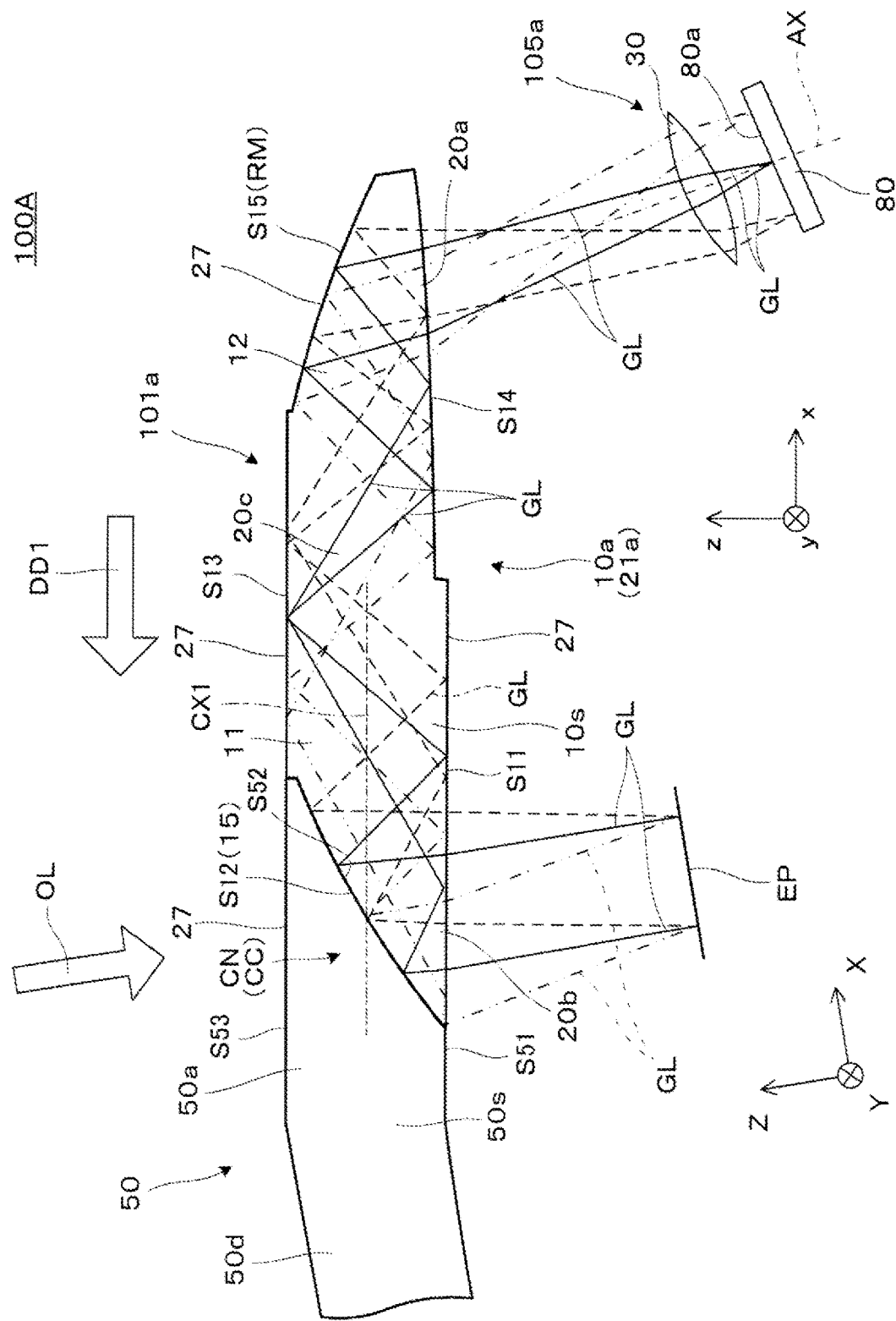
FIG. 4 is an explanatory plan cross-sectional view conceptually illustrating a structure of a display device on one side and an optical path of video light.

FIG. 4 is a view partially illustrating the first display device 100A, which specifically extracts a part of the optical system. As already described above, the virtual image display apparatus 100 is constituted by the first display device 100A and the second display device 100B (see FIG. 1), where the first display device 100A and the second display device 100B have right-left symmetrical and mutually equivalent structures, thus the first display device 100A will be exclusively described, and the first display device 100A will be omitted to be described. Note that in FIG. 4, x, y, and z form orthogonal coordinate system, the x and y directions are parallel to the first face S11 and third face S13, and the z direction is perpendicular to the first face S11 and third face S13.

The first display device 100A includes, as the image forming body 105a, an image forming device 80 that generates image light, and a projection lens 30 for imaging.

The image forming device 80 is a self-luminous display element typified by, for example, an organic electro-luminescence (organic EL), an inorganic EL, an LED array, an organic LED, a laser array, a quantum dot emission type element, and the like, and forms a still image or a video image in color on a display region 80a of two-dimensional. The image forming device 80 is driven by a non-illustrated drive control circuit to perform a display operation. When an organic EL display is used as the image forming device 80, the image forming device 80 is configured to include an organic EL control unit. When a quantum dot display is used as the image forming device 80, the image forming device 80 is configured to emit green or red color by causing light of a blue light emitting diode (LED) to pass through a quantum dot film. The image forming device 80 is not limited to a self-luminous display element, and may be constituted by a light modulating element such as an LCD, and may form an image by illuminating the light modulating element with a light source such as a backlight. As the image forming device 80, a liquid crystal on silicon (LCO; LCoS is a trade name), a digital micromirror device, and the like may be used in place of the LCD.

The projection lens 30 protrudes the image light generated by the image forming device 80 toward the light-guiding member 10a of the first virtual image forming optical portion 101a, and causes the image light to be incident on the light-incident portion 20a. The projection lens 30 is a projection optical system including, as components, one or more optical elements or lenses aligned along a direction in which an incident-side optical axis AX extends. The optical elements that constitute the projection lens 30 are held by a non-illustrated lens barrel, which is housed and supported by the case member 105d (see FIG. 1). Note that the optical elements constituting the projection lens 30 can be constituted by aspherical lenses including both an aspherical surface being non-axisymmetric and an aspherical surface being axisymmetric, for example. Then, the optical elements can allow an intermediate image corresponding to a displayed image on the display region 80a to be formed inside the light-guiding member 10a in cooperation with the optical surface or the reflective surface of the light-guiding member 10a.

The light-guiding member 10a in the first virtual image forming optical portion 101a is joined to the light transmissive portion 50a via an adhesive layer CC, where the adhesive layer CC and a joining surface between the light-guiding member 10a and the light transmissive portion 50a interpose the adhesive layer CC are referred to as joining portion CN. The light-guiding member 10a and the light transmissive portion 50a have a structure in which surfaces of body members 10s and 50s are covered with an overcoat layer 27. The overcoat layer 27 is specifically a hard coat layer, and functions as a protective layer that suppresses scratching and the like of surface portions exposed at the first virtual image forming optical portion 101a.

The body member 10s in the light-guiding member 10a is composed of a resin material having high light transmissivity in the visible range, and is molded, for example, by pouring a thermoplastic resin into a mold and curing the resin. Note that a cycloolefin polymer or the like can be used as the material of the body member 10s. The same as above also applies to the light transmissive portion 50a, and the body member 50s is composed of the same material as the body member 10s of the light-guiding member 10a. The overcoat layer 27 is produced, using a material having visible light transmissivity, such as a silicone-based hard coat material, through processes of applying, drying, and curing such a coating material.

Hereinafter, the optical path of the image light (referred to as image light GL herein) will be briefly described below. The light-guiding member 10a allows the image light GL to be incident from the projection lens 30 and guides the image light GL toward an eye of the observer by a reflection at the first to fifth faces S11 to S15. Specifically, the image light GL from the projection lens 30 is firstly incident on a part of the fourth face S14 provided at the light-incident portion 20a, to then be reflected by the fifth face S15. Then, the image light GL re-enters the fourth face S14 from inside to be totally reflected, enters the third face S13 to be totally reflected, and is then incident on the first face S11 to be totally reflected. The image light GL totally reflected by the first face S11 is incident on the second face S12 and is partially reflected by the half mirror 15 provided at the second face S12 while partially passing through the half mirror 15, and then re-enters a part of the first face S11 provided at the light-emitting portion 20b to pass therethrough. The image light GL passing through the first face S11 is incident, as a substantially parallel luminous flux, on an exit pupil EP where an eye of the observer is disposed. That is, the observer is to observe an image by image light as a virtual image.

The first virtual image forming optical portion 101a is configured to allow the observer to visually recognize the image light by the light-guiding member 10a, and to allow the observer to observe an external image with little distortion by the light-guiding member 10a in a state combined with the central member 50. Then, the third face S13 and the first face S11 are flat planes that are substantially parallel to each other (the eyepiece visibility is approximately zero), to hardly cause an aberration and the like for the external light OL. Similarly, the third transmission face S53 and the first transmission face S51 are flat planes that are substantially parallel to each other as well. In addition, the third transmission face S53 and the first face S11 are flat planes that are substantially parallel to each other, to hardly cause an aberration and the like. As described above, the observer is to observe a distortion-free external image through the central member 50. Note that a light guiding direction DD1 of the entirety of the luminous flux of the image light GL at the light-guiding member 10a is a direction in which the light-guiding member 10a and the light transmissive portion 50a extend as illustrated in the figure, and the light guiding direction DD1 is typically parallel to the center axis CX1 that will be described below.

Figure 5A:
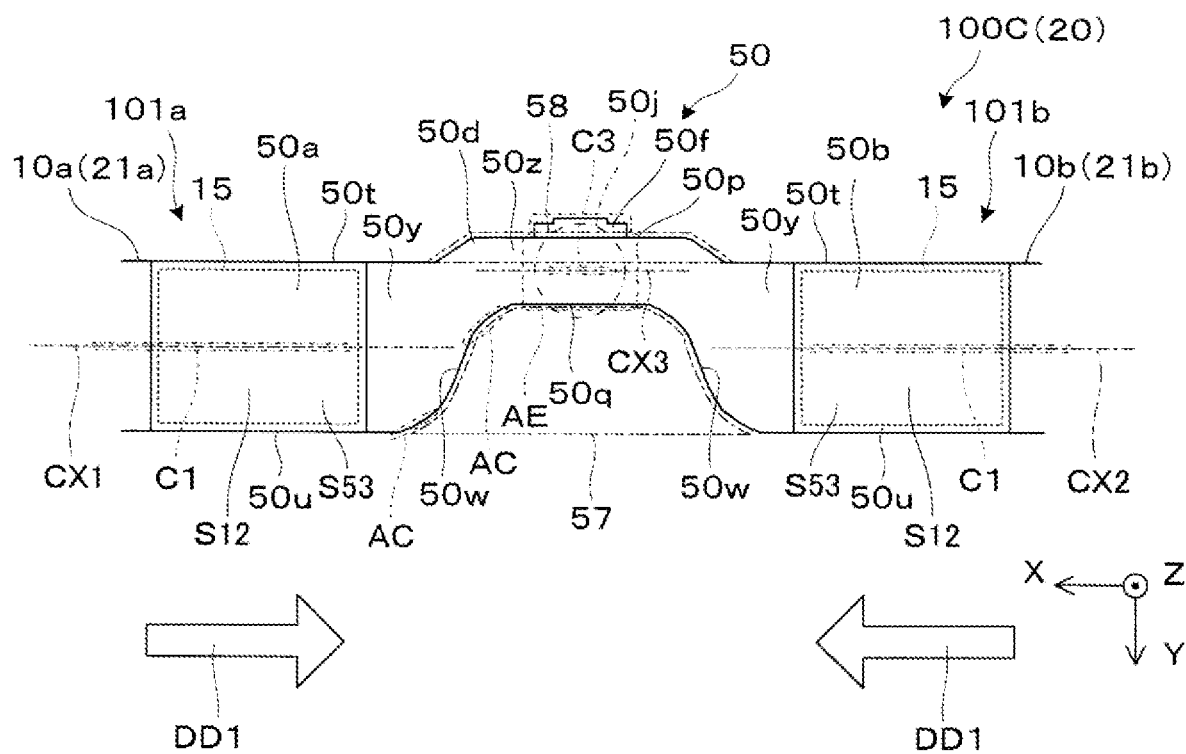
FIG. 5A is an explanatory front view partially illustrating a structure of a central member of a see-through light-guiding unit.

The shape of the see-through light-guiding unit 100C or the central member 50, particularly the shape and structure of the coupling portion 50d will be described below with reference to FIG. 5A. In the see-through light-guiding unit 100C, the coupling portion 50d of the central member 50 includes a pair of end portions 50y coupled to the optical members 21a and 21b via the light transmissive portions 50a and 50b, and a bridge portion 50z extending between the pair of end portions 50y. The bridge portion 50z is a portion composed by the protrusion portion 58 combined with the notch 57. The protrusion portion 58 is a portion that protrudes in a trapezoidal shape with respect to the upper surface 10t or the upper surface 50t, which is the upper end of the light-guiding member 10a in a front view, and the notch 57 is a portion being recessed in a trapezoidal shape with respect to the lower surface 10u or the lower surface 50u, which is the lower end of the light-guiding member 10a in a front view. The notch 57 is sufficient to block a straight light path between the light-guiding members 10a and 10b, and is recessed upward or toward the −Y direction to narrow the light path from the lower side. The protrusion portion 58, which serves to compensate a decrease in strength of the coupling portion 50d due to the formation of the notch 57, bulges upward or toward the −Y direction, to suppress a decrease in thickness related to the vertical direction or the ±Y direction of the bridge portion 50z.

The bridge portion 50z includes the lateral middle portion 50j at the middle in the lateral ±x direction as a portion interposed by the pair of end portions 50y. That is, the lateral middle portion 50j is a part of the coupling portion 50d or the bridge portion 50z. In the lateral middle portion 50j, a center C3 related to the Y direction orthogonal to the light guiding direction DD1 (see FIG. 4) due to the light-guiding members 10a and 10b is disposed in a state shifted toward the −Y direction side being upward relative to centers C1 and C2 related to the Y direction of the light-guiding members 10a and 10b or the optical members 21a and 21b. In the above state, the center C3 related to the Y direction of the lateral middle portion 50j is at a position through which the center axis CX3 of the lateral middle portion 50j passes. In addition, the center C1 related to the Y direction of the optical member 21a is at a position through which the center axis CX1 of the light-guiding member 10a and the like passes, and the center C2 of the optical member 21b related to the Y direction is at a position through which the center axis CX2 of the light-guiding member 10b passes. Although not illustrated in the figure, the center C3 of the lateral middle portion 50j in the bridge portion 50z is disposed in the −Y direction above the upper end of the half mirror 15 or an effective region of the half mirror 15, or the center C3 is disposed in the −Y direction above the upper surface 10t or the upper surface 50t of the optical member 21a, to thus more reliably suppress the image light from coming and going between the pair of optical members 21a and 21b. Moreover, the lower surface 50q of the lateral middle portion 50j in the bridge portion 50z is disposed in the −Y direction above the upper end of the half mirror 15 or the effective region of the half mirror 15, or the lower surface 50q is disposed in the −Y direction above the upper surface 10*t* or the upper surface 50*t* of the optical member 21*a*, to thus enhance an effect of blocking the image light.

Figure 5B:
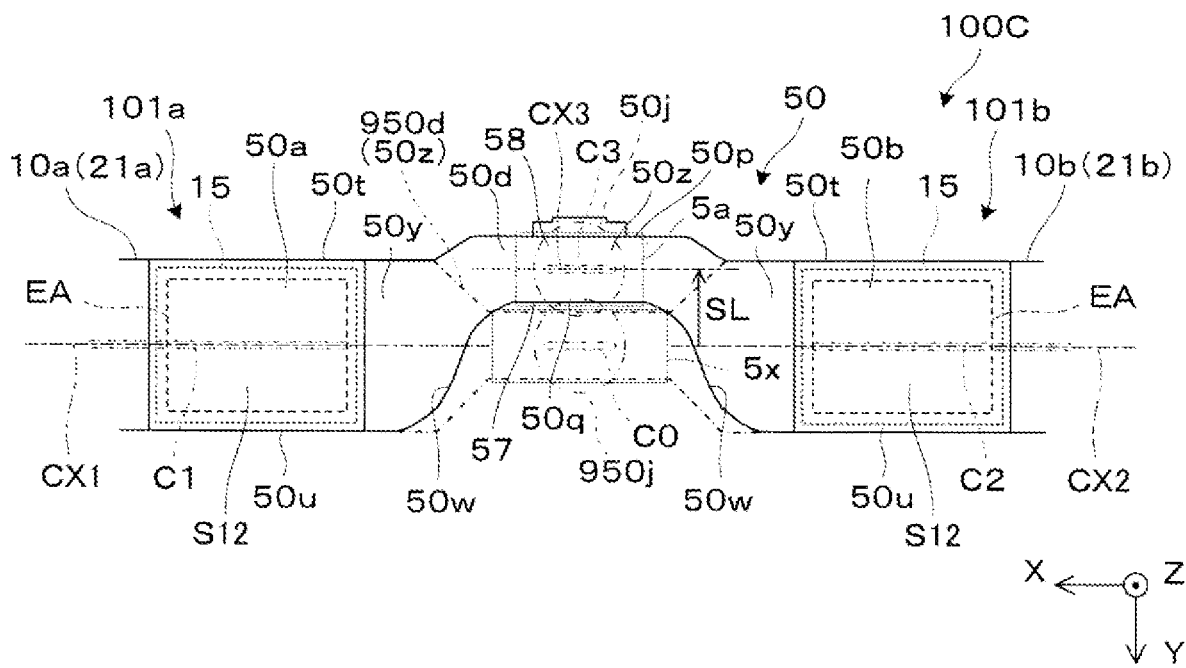
FIG. 5B is an explanatory front view partially illustrating a shape of a central member of a see-through light-guiding unit.

The shape of the coupling portion 50*d* or the bridge portion 50*z* will be described below in a different view point, with reference to FIG. 5B. A coupling portion 950*d* indicated by a dot-dash line represents a comparative example, which is virtual and standard, having a shape being vertically balanced. In case of the coupling portion 950*d* of the comparative example, the coupling portion 950*d* has a shape being vertically balanced, the width related to the vertical direction or the ±Y direction gradually decreases toward both ends, and the width or wall thickness in the vertical direction becomes uniform at the center. In a lateral middle portion 950*j* of the bridge portion 50*z*, the center C0 related to the −Y direction as a first direction is disposed at an identical position related to the ±Y direction relative to the centers C1 and C2 related to the −Y direction as the first direction of the optical members 21*a* and 21*b*. On the other hand, in case of the coupling portion 50*d* of the embodiment, the center C3 related to the vertical location of the lateral middle portion 50*j* is disposed in a state shifted by a distance SL toward the −Y direction side being upward relative to the centers C1 and C2 related to the vertical location of the optical members 21*a* and 21*b* and the center C0 related to the vertical location of the lateral middle portion 950*j* being vertically balanced of the comparative example. A body part 5*a* in a rod-like form constituting the coupling portion 50*d* of the embodiment has a shape and arrangement that a body part 5*x* in a rod-like form constituting the coupling portion 950*d* of the comparative example is shifted toward the −Y direction side being upward. As described above, the body part 5*x* is appropriately shifted toward the −Y direction side being upward, to thus form the protrusion portion 58 at the upper side, and the notch 57 at the lower side.

The protrusion portion 58 is, but not limited to, a trapezoidal shape as illustrated in the figure, and is sufficient to have a shape that does not abut against between the eyebrows, and may be, for example, a thick portion that reinforces the strength of the coupling portion 50*d* by an increase of the thickness. The protrusion portion 58 may have a shape that protrudes at two locations, for example. The notch 57 is, but not limited to, a trapezoidal shape as illustrated in the figure, and may be, for example, a recess such as a triangular, square, or semi-circular shape, in a front view. At the center of the notch 57, the lower surface 50*q* is not required to be parallel to the XZ surface, and may be a surface being inclined toward the inner side or the −Z side, for example. When the protrusion portion 58 has a shape that protrudes at two locations, the notch 57 may be two notched parts recessed upward at the lower side of the two protrusion portions 58.

Figure 6:
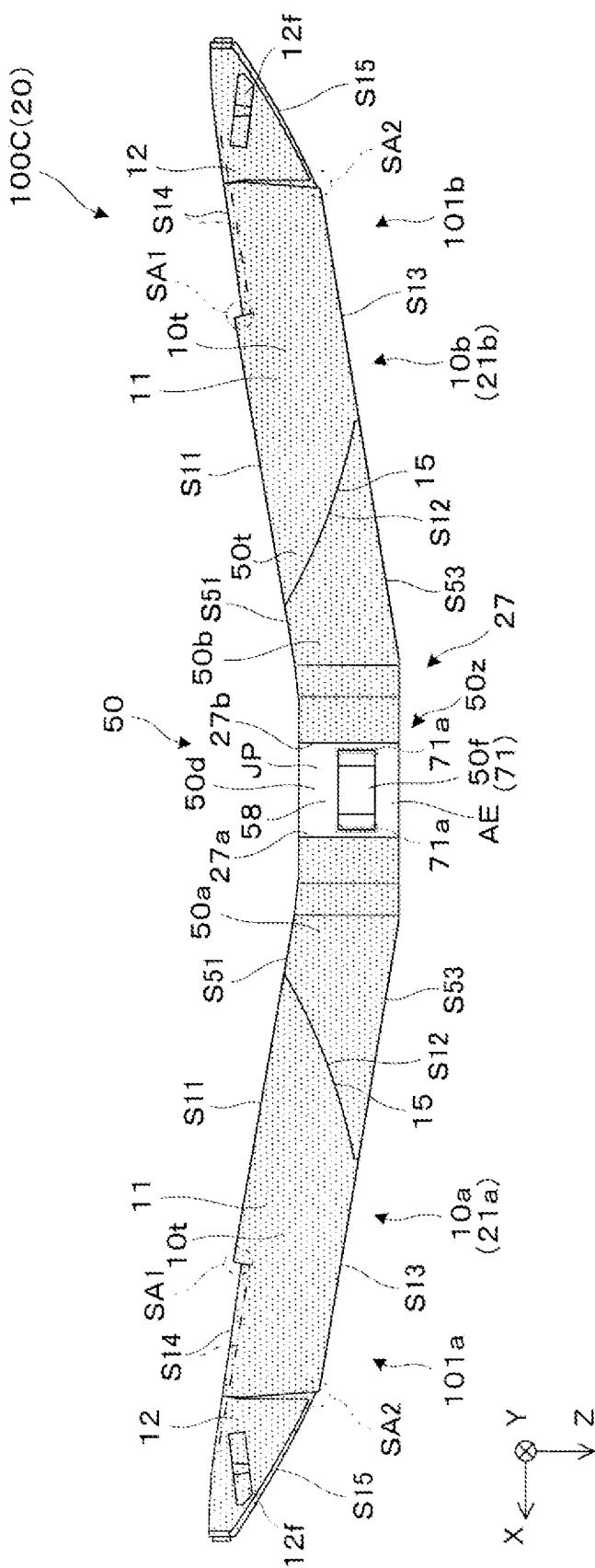
FIG. 6 is an explanatory plan view illustrating a range in which an overcoat layer is formed.

FIG. 6 is an explanatory view illustrating the overcoat layer 27 formed at a surface of the see-through light-guiding unit 100C or the light-guiding device 20. The overcoat layer 27 includes, as illustrated in the figure as small dot patterned regions, a first overcoat layer 27*a* and a second overcoat layer 27*b*, as separate overcoat layers or a pair of overcoat layers covering a base material JP that should become the light-guiding device 20. The first overcoat layer 27*a* is provided at the optical member 21*a* on one side, and the second overcoat layer 27*b* is provided at the optical member 21*b* on the other side. The first overcoat layer 27*a* and the second overcoat layer 27*b* are spaced apart from each other at the approximate center or the center portion of the central member 50 (the lateral middle portion 50*j*), to form an exposed region AE. That is, the first overcoat layer 27*a* on one hand is provided at the light-guiding member 10*a* constituting the first virtual image forming optical portion 101*a* and at the remaining region excluding the center portion of the bridge portion 50*z* in the central member 50. The second overcoat layer 27*b* on the other hand is provided at the light-guiding member 10*b* constituting the second virtual image forming optical portion 101*b* and the remaining regions excluding the center portion of the bridge portion 50*z* in the central member 50. As a result, both the overcoat layers 27*a* and 27*b* are provided in a manner to avoid the positioning locations 71*a* of the positioning structure 71. This allows finishing accuracy of the positioning locations 71*a* to be maintained in a simple manner. The first overcoat layer 27*a* and the second overcoat layer 27*b* may be composed of an identical material or composition, or may be composed of different materials or compositions.

The see-through light-guiding unit 100C includes, at the back side on which the exit pupil EP is provided, an outward step SA1 in a concave shape at a tip end side away from the central member 50, and includes, at the front side on which the external light is incident, an outward step SA2 in a concave shape at the tip end side away from the central member 50, that is at the light-incident portion 20*a* side. The outward step SA1 on one hand is provided in the boundary region between the first face S11 and the fourth face S14, extends substantially along the vertical ±Y direction, and is covered by the overcoat layers 27*a* and 27*b*. The direction in which the outward step SA1 extends is substantially orthogonal to the light guiding direction DD1 (see FIG. 4), and is substantially orthogonal to a pulling-up direction DX1 (see FIG. 7) that will be described below, and corresponds to the vertical direction when the see-through light-guiding unit 100C is worn. The outward step SA2 on the other hand is provided in the boundary region between the third face S13 and the fifth face S15, extends substantially along the vertical ±Y direction, and is covered by the overcoat layers 27*a* and 27*b*. The direction in which the outward step SA2 extends is substantially orthogonal to the light guiding direction DD1 (see FIG. 4) and the pulling-up direction DX1 (see FIG. 7), and corresponds to the vertical direction when the see-through light-guiding unit 100C is worn.

The outward steps SA1 and SA2 provided at the light-guiding member 10*a* corresponding to the right eye correspond to the first overcoat layer 27*a*, where when the base material JP is pulled up from a coating solution in forming the first overcoat layer 27*a*, the base material JP is favorably moved toward the −X direction with the tip end side at which the light-incident portion 20*a* is provided being located at the lower side. In this case, the outward steps SA1 and SA2 are in an overhanging state, suppressing an occurrence of a liquid pooling of the coating solution. Note that, contrary to the above, when the base material JP is moved toward the +X direction with the tip end side at which the light-incident portion 20*a* is provided being located at the upper side, a large liquid pooling of the coating solution readily occurs at the outward steps SA1 and SA2 in a shelf shape, to facilitate an occurrence of dripping under the liquid pooling. Similarly, the outward steps SA1 and SA2 provided at the light-guiding member 10*b* corresponding to the left eye correspond to the overcoat layer 27*b*, where when the base material JP is pulled up from a coating solution in forming the overcoat layer 27*b*, the base material JP is favorably moved toward the +X direction with the tip end side at which the light-incident portion 20*a* is provided being located at the lower side. In this case, the outward steps SA1 and SA2 are in an overhanging state, suppressing an occurrence of a liquid pooling or dripping of the coating solution.

Figure 7:
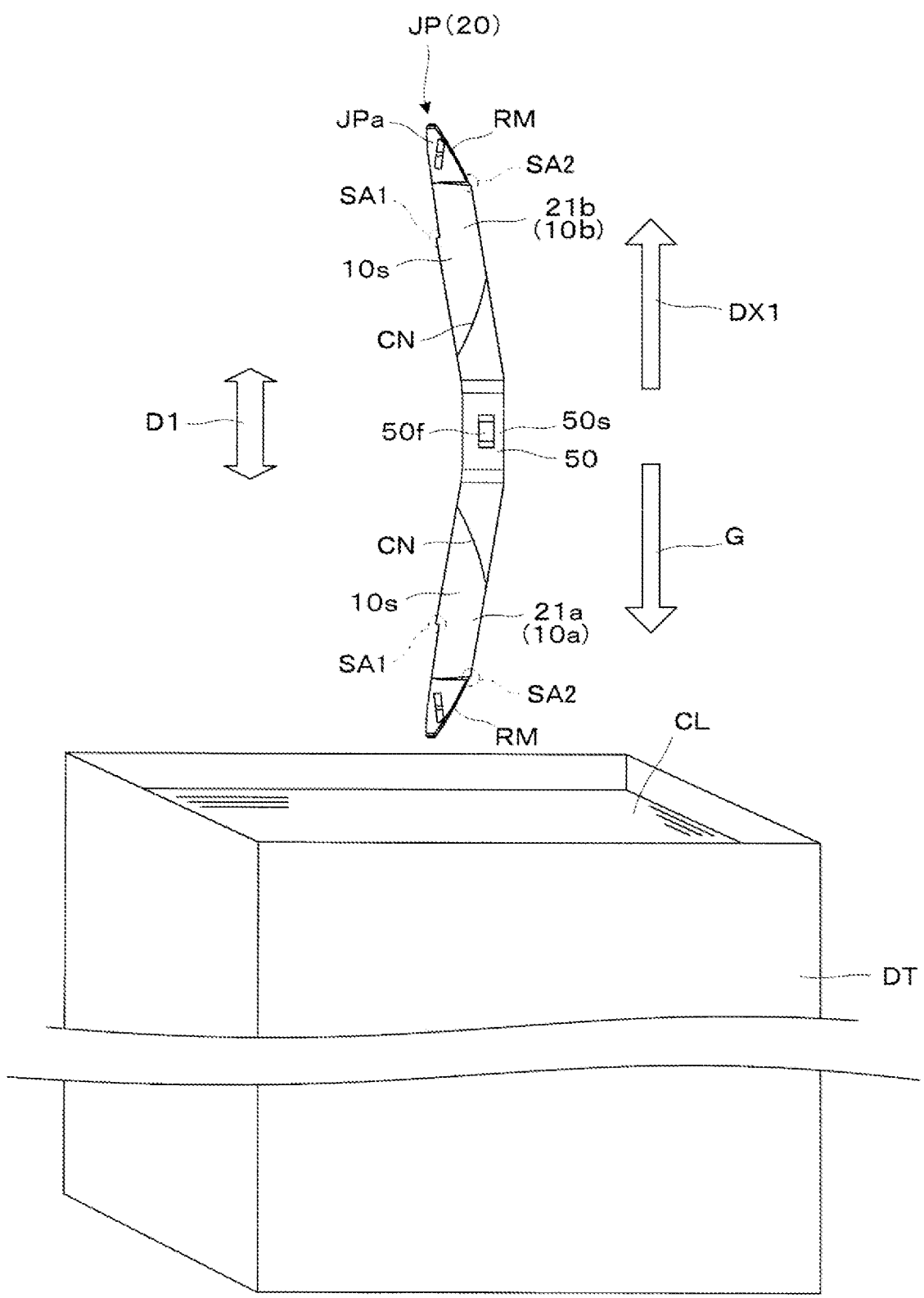
FIG. 7 is an explanatory perspective view conceptually illustrating a method of forming an overcoat layer.

A film formation of the overcoat layer 27, which is a main part of the method for manufacturing the light-guiding device 20, will be described below with reference to FIG. 7. The base material JP is prepared beforehand, in which the body members 10s of the pair of optical members 21a and 21b are joined, from the both ends, to the body member 50s of the central member 50. The base material JP is composed such that the half mirror 15 is embedded at the joining portion CN. In addition, the base material JP is provided with the reflective film RM of the fifth face S15. Note that FIG. 7 illustrates a state prior to a formation of a surface portion such as an optical surface, however, even the base material JP before the formation of the overcoat layer 27, for example, is illustrated as the light-guiding device 20, for convenience of explanation.

As illustrated in the figure, the base material JP is caused to be in a state of being fixed to and hung from a non-illustrated jig of an elevating mechanism at an attachment location JPa at one end, and a processing tank DT filled with a coating solution CL is prepared. The base material BT is moved up and down along the direction indicated by an arrow Dl while being supported by the jig of the elevating mechanism, and then, the film formations of the pair of overcoat layers 27a and 27b constituting the overcoat layer 27 are to be sequentially performed. Note that one of the directions indicated by the arrow Dl is a gravitational direction G, and corresponds to an operation of immersing the base material JP in the coating solution CL, and the other is the pulling-up direction DX1 in which the base material JP is elevated from the coating solution CL against the gravitational force.

Figure 8:
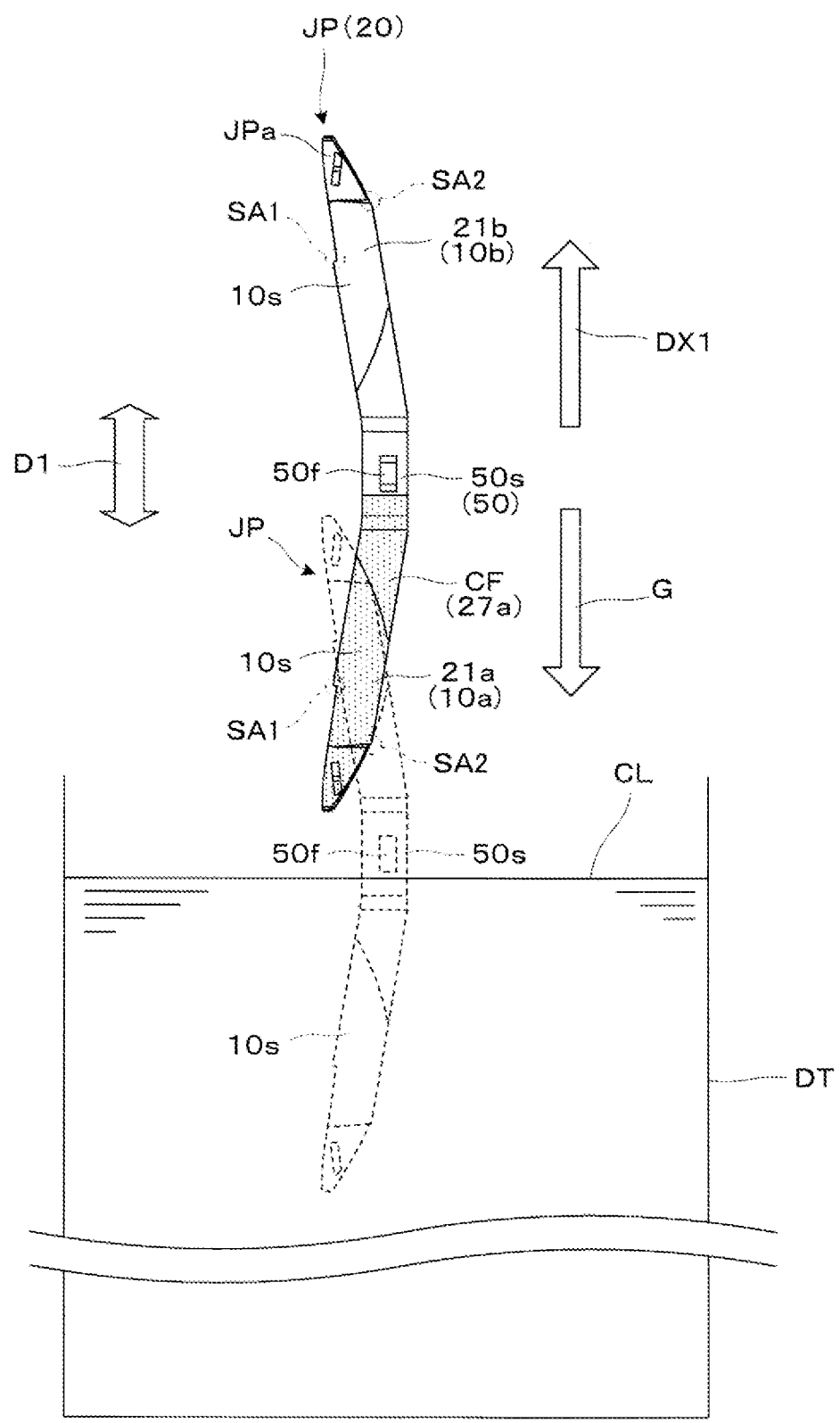
FIG. 8 is an explanatory view illustrating a forming process of an overcoat layer.

First, as indicated by a dotted line in FIG. 8, the base material JP is moved downward in the gravitational direction G, to be brought into a state where the lower half of the base material JP is immersed in the processing tank DT containing the coating solution CL. Here, the protrusion portion 50f on the base material JP is prevented from being immersed in the coating solution CL. Thereafter, as indicated by a solid line in FIG. 8, the base material JP is pulled up in the pulling-up direction DX1 at a predetermined speed, to be brought into a state where the coating solution CL has been applied to the surface of the base material JP. The coating solution CL applied to the surface of the base material JP forms a coating film CF that covers the surface of the lower half of the base material JP with substantially uniform thickness by flowing on the surface of the base material JP pursuant to the gravitational force, the viscosity and surface tension of the coating solution CL, and the like. Then, the coating film CF becomes thick due to the liquid pooling of the coating solution CL at the recesses of the outward steps SA1 and SA2, however, the liquid pooling does not become large. The coating film CF on the base material JP, after being dried, is subjected to processing of ultraviolet radiation or heating to be cured, forming the first overcoat layer 27a.

Figure 9:
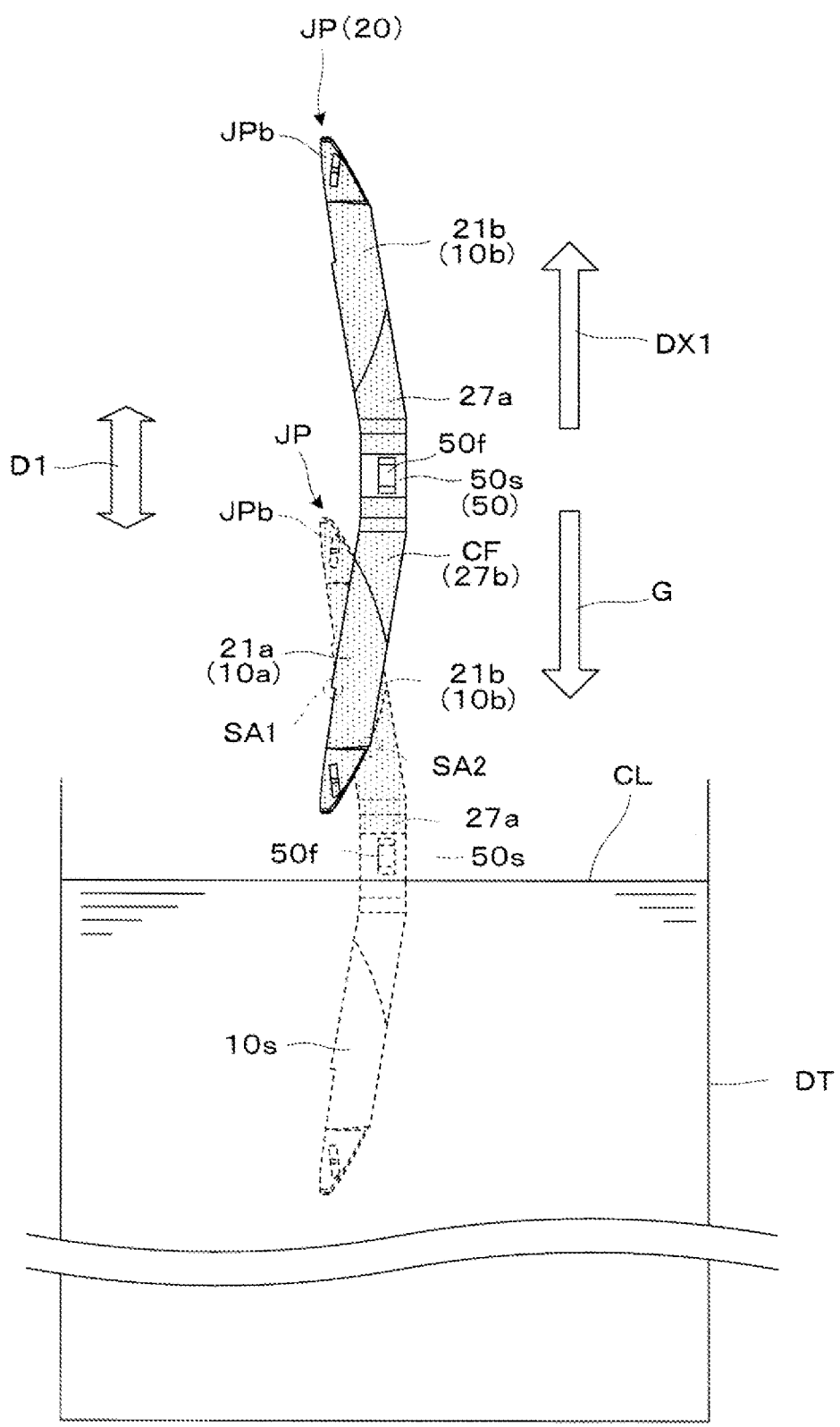
FIG. 9 is an explanatory view illustrating a forming process of an overcoat layer.

Next, as indicated by a dotted line in FIG. 9, the base material JP being vertically inverted is moved downward in the gravitational direction G while being fixed to the jig at an attachment location JPb at the other end, to be brought into a state where the lower half of the base material JP is immersed in the processing tank DT containing the coating solution CL. Here, the protrusion portion 50f on the base material JP is prevented from being immersed in the coating solution CL. Thereafter, as indicated by a solid line in FIG. 9, the base material JP is pulled up in the pulling-up direction DX1 at a predetermined speed, to be brought into a state where the coating solution CL has been applied to the surface of the base material JP. The coating solution CL applied to the surface of the base material JP forms a coating film CF that covers the surface of the lower half of the base material JP with substantially uniform thickness. Then, the coating film CF becomes thick due to the liquid pooling of the coating solution CL at the recesses of the outward steps SA1 and SA2, however, the liquid pooling does not become large. The coating film CF on the base material JP, after being dried, is subjected to processing of ultraviolet radiation or heating to be cured, forming the first overcoat layer 27b.

Although descriptions are omitted above, a local polishing on the joining portion CN of the base material JP may be performed as a preprocessing prior to the film formation of the overcoat layer 27. In addition, as the preprocessing prior to the film formation of the overcoat layer 27, an underlayer film for embedding and smoothing the processing marks formed at the surface of the base material JP may also be formed.

In the light-guiding device 20 of the first embodiment, separate hard coat layers 27a and 27b provided at the optical member 21a on one side and the optical member 21b on the other side relative to the approximate center of the central member 50 enables manufacturing the hard coat layers 27a and 27b of the pair of optical members 21a and 21b in symmetrical processes, and thus the liquid poolings of the coating solution CL occur in symmetrical manners on the surfaces of the optical members 21a and 21a and the base material JP of the central member 50, to collectively eliminate, at the pair of optical members 21a and 21b, a deterioration such as whitening or uneven thicknesses of the hard coat layers 27a and 27b, and to thus manufacture the hard coat layers 27a and 27b being defect-free at a high yield.

In the method for manufacturing the light-guiding device of the first embodiment, separate overcoat layers 27a and 27b are formed at the optical member 21a on one side and the optical member 21b on the other side relative to the approximate center of the central member 50, to manufacture the overcoat layers 27a and 27b of the pair of optical members 21a and 21b in symmetrical processes, and to collectively eliminate, at the pair of optical members 21a and 21b, a deterioration such as whitening or uneven thicknesses of the hard coat layers 27a and 27b.

Second Embodiment

Figure 10:
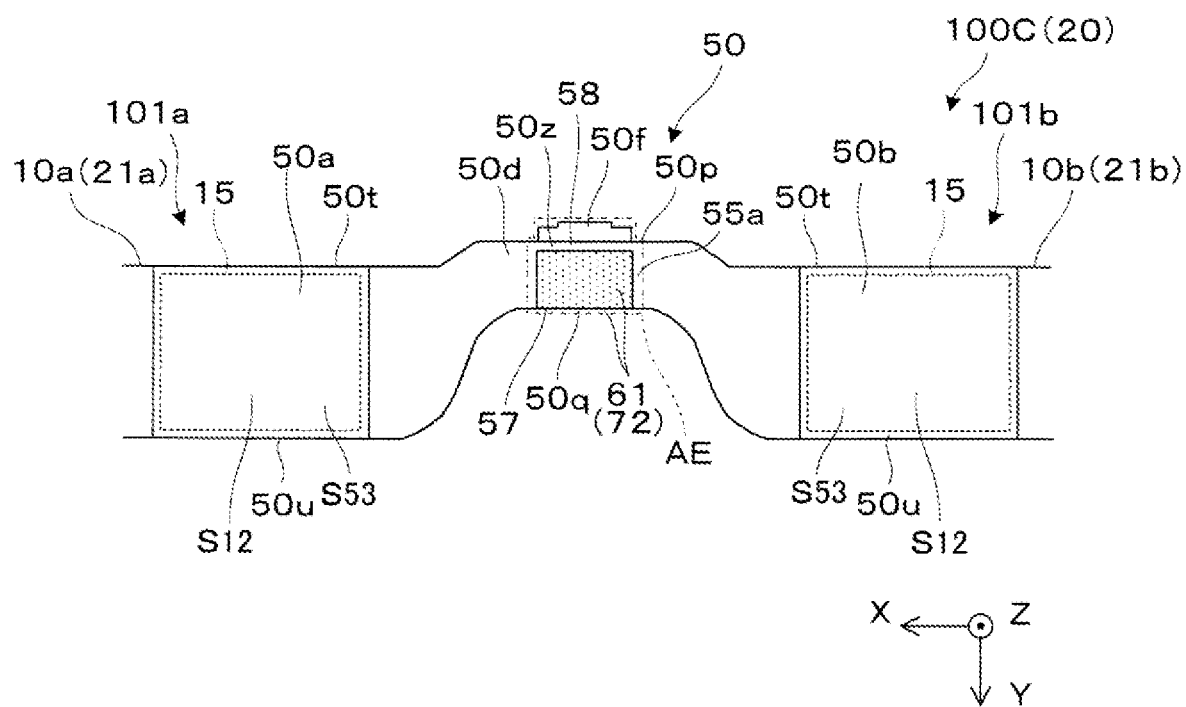
FIG. 10 is an explanatory front view partially illustrating a light-guiding device according to a second embodiment.

Hereinafter, a light-guiding device and a virtual image display apparatus according to the second embodiment will be described below with reference to FIG. 10. Note that the light-guiding device and the virtual image display apparatus according to the second embodiment are partially modified from the light-guiding device and the like according to the first embodiment, and descriptions on the common parts are omitted.

In case of the light-guiding device 20 illustrated in the figure, a surface scattering layer 61 is provided as a light-guide blocking structure 72, on a front surface 55a, the lower surface 50q, and the like, in the exposed region AE devoid of the overcoat layer 27 (see FIG. 6) provided at the bridge portion 50z in the central member 50. The surface scattering layer 61, which is a diffusion surface including a fine concavo-convex structure that scatters image light, can be formed by surface texturing, for example. The surface texturing can be conducted by transferring with a mold when molding is performed. A provision of the surface scattering layer 61 in a manner partially covering the surface of the central member 50 allows image light to be scattered and dimmed at the time when the image light passes through the coupling portion 50d. That is, the image light passing through the central member 50 from one of the optical members 21a and 21b to the other can be reduced, and thus the image light contributing to forming of a ghosting can be reduced. Note that the arrangement and size of the surface scattering layer 61 illustrated in FIG. 10 are given as mere examples, and can be appropriately modified depending on the specifications of the light-guiding device 20.

A provision of the surface scattering layer 61 in the exposed region AE can prevent a reduction of scattering efficiency due to the coverage of the surface scattering layer 61 by the overcoat layer 27.

Third Embodiment

Figure 11:
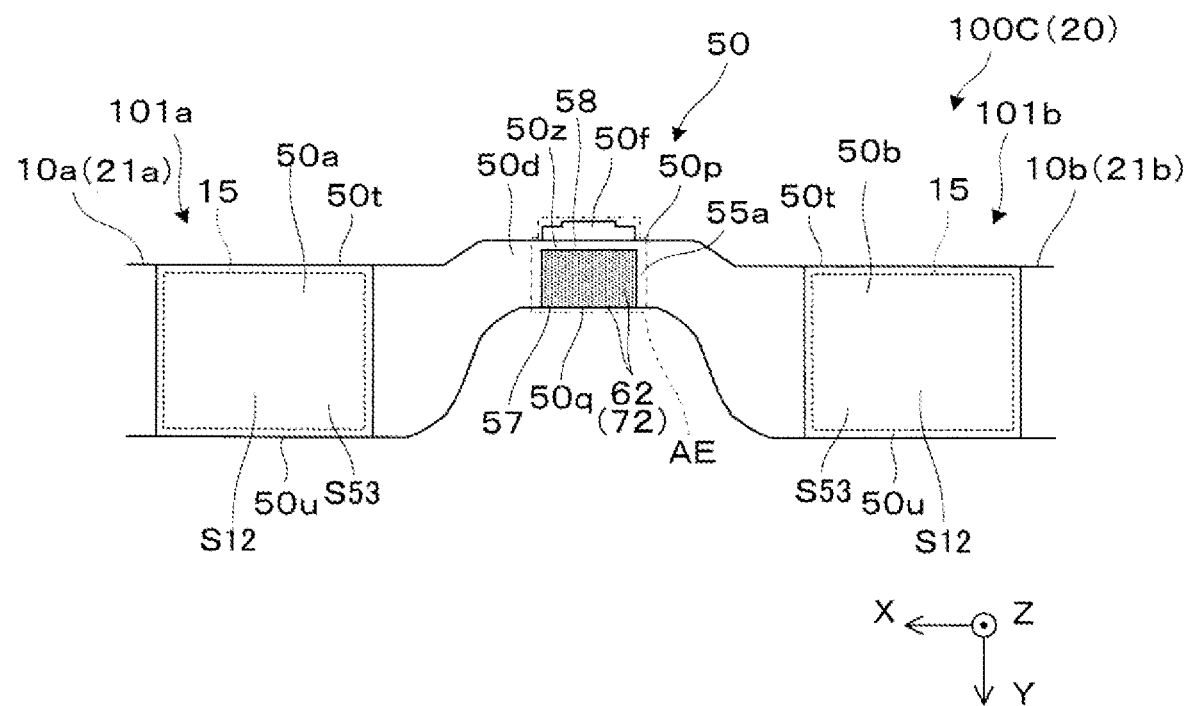
FIG. 11 is an explanatory front view partially illustrating a light-guiding device according to a third embodiment.

Hereinafter, a light-guiding device and a virtual image display apparatus according to the third embodiment will be described below with reference to FIG. 11. Note that the light-guiding device and the virtual image display apparatus according to the third embodiment are partially modified from the light-guiding device and the like according to the first embodiment, and descriptions on the common parts are omitted.

In case of the light-guiding device 20 illustrated in the figure, a surface absorption layer 62 is provided as the light-guide blocking structure 72, on the surfaces such as the front surface 55a, the lower surface 50q, and the like, in the exposed region AE devoid of the overcoat layer 27 (see FIG. 6) provided at the bridge portion 50z in the central member 50. The surface absorption layer 62 is a colored part that absorbs image light. A provision of the surface scattering layer 61 in a manner partially covering the surface of the central member 50 allows the image light to be scattered and dimmed at the time when the image light passes through the coupling portion 50d. That is, the image light passing through the central member 50 from one of the optical members 21a and 21b to the other can be reduced, and thus the image light contributing to forming of a ghosting can be reduced. Note that the arrangement and size of the surface absorption layer 62 illustrated in FIG. 11 are given as mere examples, and can be appropriately modified depending on the specifications of the light-guiding device 20.

The surface absorption layer 62 is formed by applying and drying a light-absorbing coating material. Specifically, the surface absorption layer 62 is formed by an application of a light-blocking coating material, black-painting, or the like. A provision of the surface absorption layer 62 in the exposed region AE can prevent an application process of the surface absorption layer 62 from being hindered by the overcoat layer 27 formed in the preceding processes.

The surface absorption layer 62 is not required to completely block visible light passing through the coupling portion 50d. The surface absorption layer 62 is colored in black opaque in specific examples, but may be one, like ND filter, having semi-transparent properties as long as uniformly absorbing the light in the respective wavelength ranges, or may have biased characteristics that readily transmit light of some wavelengths.

Fourth Embodiment

Hereinafter, a light-guiding device and a virtual image display apparatus according to the fourth embodiment will be described below with reference to FIGS. 12 and 13. Note that the light-guiding device and the virtual image display apparatus according to the fourth embodiment are partially modified from the light-guiding device and the like according to the first embodiment, and descriptions on the common parts are omitted.

Figure 12:
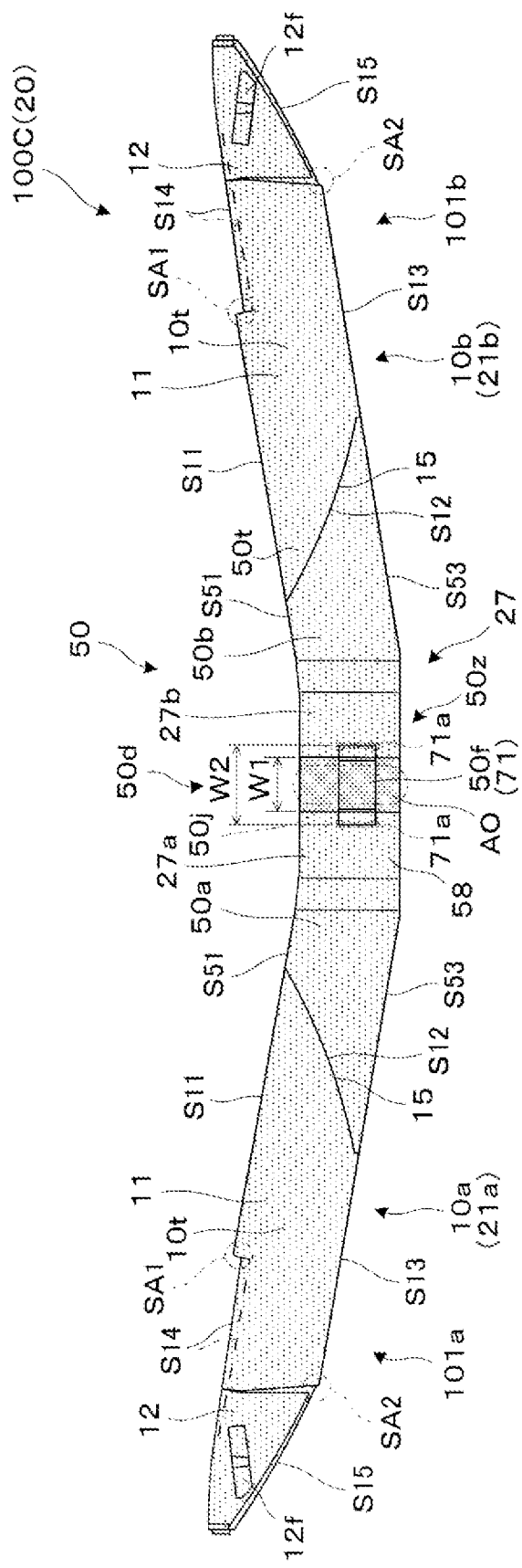
FIG. 12 is an explanatory plan view illustrating a light-guiding device according to a fourth embodiment.

In case of the light-guiding device 20 illustrated in FIG. 12, the first overcoat layer 27a and the second overcoat layer 27b corresponding to the right and left at the center portion (the lateral middle portion 50j) of the central member 50 are overlapped to form an overlapped portion AO in a strip shape. Both the overcoat layers 27a and 27b are overlapped to facilitate controlling of the immersion depth and the like, making it easy to fabricate both the overcoat layers 27a and 27b, and further enabling an overcoat to protect the entirety of the central member 50. Here, a lateral width w1 of the overlapped portion AO is narrower than a lateral width w2 of the positioning structure 71, and the positioning locations 71a of the positioning structure 71 are located outside of the overlapped portion AO. That is, the pair of overcoat layers 27a and 27b are in a state of individually covering the positioning locations 71a. As a result, the overlapped portion AO is provided in a manner to avoid the positioning locations 71a of the positioning structure 71. In this case, the positioning locations 71a are covered by the overcoat layers 27a and 27b, however, if the thicknesses of both the overcoat layers 27a and 27b are approximately equal to each other and thin, positioning accuracies of the center cover 100D and the other components can be prevented from being lowered. The first overcoat layer 27a and the second overcoat layer 27b may be composed of an identical material or composition, as well as may be composed of different materials or compositions. Even if the first overcoat layer 27a and the second overcoat layer 27b are composed of an identical material, both the overcoat layers 27a and 27b, when separately provided, are separate overcoat layers. Even if both the overcoat layers 27a and 27b are composed of an identical material, for example, a composition distribution biased along the thickness direction is formed in many cases within the overcoat layers 27a and 27b, where in these cases, a boundary face having a slight composition transition is formed between both the overcoat layers 27a and 27b.

Figure 13:
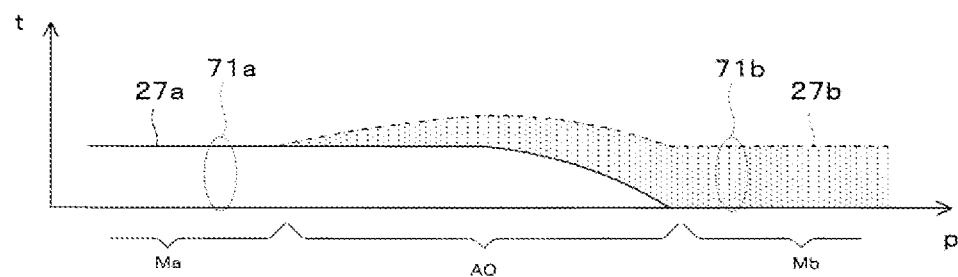
FIG. 13 is an explanatory graph illustrating thickness of an overcoat layer.

FIG. 13 is an explanatory graph illustrating thickness of the overcoat layers 27a and 27b at and around the overlapped portion AO. The horizontal axis p indicates the positions in the X direction, and the vertical axis t indicates the thicknesses of the overcoat layers 27a and 27b. Here, the region indicated by the fine dot pattern indicates the thickness of the overcoat layer 27b formed at the rear side. The overcoat layers 27a and 27b being actual layers, particularly the overcoat layer 27b at the upper side, has a tendency of becoming non-uniform in thickness due to the water repelling effect. As apparent from the figure as well, at the overlapped portion AO at the center, the overcoat layers 27a and 27b are overlapped and the coating thickness at the overlapped portion AO is relatively thicker than the coating thickness in single layer regions Ma and Mb outside of the overlapped portion AO. Moreover, the thicknesses are non-uniform in the overlapped portion AO, however, in the single layer regions Ma and Mb outside of the overlapped portion AO, the overcoat layers 27a and 27b are individually formed and the thicknesses are substantially equal to each other. That is, the overcoat layers 27a and 27b individually formed are to cover the respective positioning locations 71a, to eliminate the influence on the positioning accuracies.

Fifth Embodiment

Hereinafter, a light-guiding device and a virtual image display apparatus according to the fifth embodiment will be described below with reference to FIG. 14. Note that the light-guiding device and the virtual image display apparatus according to the fifth embodiment are partially modified from the light-guiding device and the like according to the first and fourth embodiments, and descriptions on the common parts are omitted.

Figure 14:
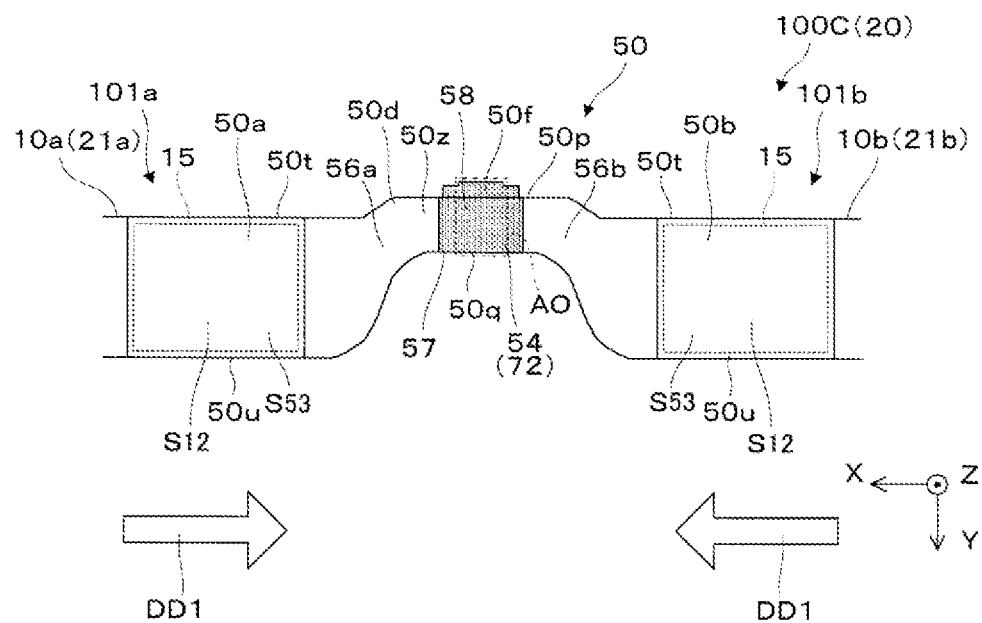
FIG. 14 is an explanatory front view partially illustrating a light-guiding device according to a fifth embodiment.

In case of the light-guiding device 20 illustrated in FIG. 14, a colored portion 54 composed of colored resin is provided at the bridge portion 50z in the central member 50. The colored portion 54 is provided in a manner traversing the bridge portion 50z, and is provided in a manner traversing the central member 50 in relation to a plane being parallel to the YZ plane. The colored portion 54 includes the light-guide blocking structure 72, and has light absorption properties for visible light. The colored portion 54 absorbs and attenuates the image light being incident on the colored portion 54. That is, the image light passing through the central member 50 from one of the optical members 21a and 21b to the other can be reduced, and the image light contributing to forming of a ghosting can be reduced. Note that the arrangement and size of the colored portion 54 illustrated in FIG. 14 are given as mere examples, and can be appropriately modified depending on the specifications of the light-guiding device 20. The colored portion 54 can be formed in the exposed region AE, without being limited to the overlapped portion AO.

A method of fabricating the central member 50 including the bridge portion 50z embedded with the colored portion 54 will be described below. The central member 50 is formed using injection molding method, which is referred to as two-color molding, for example. Specifically, a mold including a mold space corresponding to the colored portion 54 is prepared, and then a thermoplastic resin having light absorption properties is injected into this mold space, to be solidified to form the colored portion 54. Thereafter, metallic mold spaces corresponding to the light transmissive portions 50a and 50b and the like are expanded, then a thermoplastic resin having light transmissivity is injected into this expanded spaces, to thus individually form a portion including the light transmissive portion 50a and a portion at the bridge portion 50z side of the light transmissive portion 50a, and a portion including the light transmissive portion 50b and a portion at the bridge portion 50z side of the light transmissive portion 50b. Then, transition portions 56a and 56b are fused to the colored portion 54 to be firmly joined to the colored portion 54, to complete the central member 50. That is, the central member 50 integrated with the light-guide blocking structure 72 can be collectively fabricated. The resin material of the colored portion 54 is prepared from a resin material of the same type as that of the light transmissive portions 50a and 50b and a black dye added thereto, under molding conditions having difference in increased glass transition temperature and the like compared to the resin material of the light transmissive portions 50a and 50b.

The colored portion 54 is not required to completely block visible light passing through the coupling portion 50d. The colored portion 54 is colored in black opaque in specific examples, but may be one, like ND filter, having semi-transparent properties as long as uniformly absorbing the light in the respective wavelength ranges, or may have biased characteristics that readily transmit light of some wavelengths.

Figure 15:
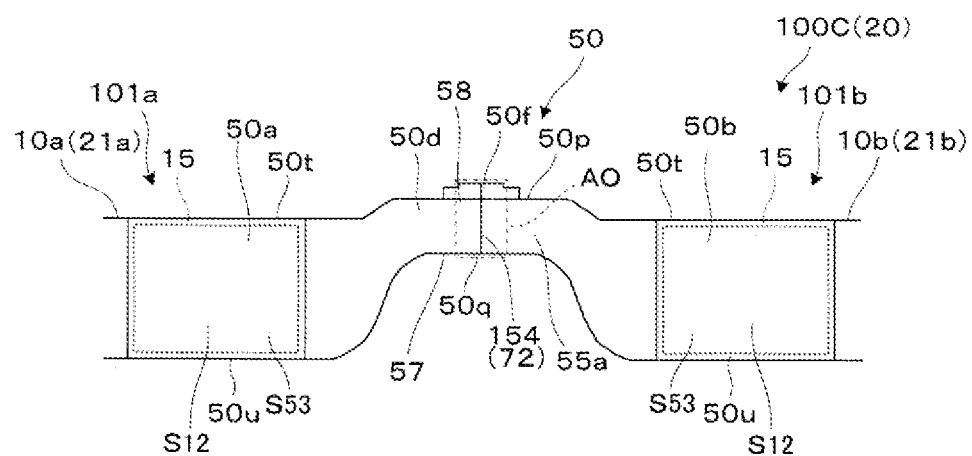
FIG. 15 is an explanatory view illustrating a modification of the light-guiding device illustrated in FIG. 14.

As in the modification illustrated in FIG. 15, a colored portion 154 being layered may also be formed to traverse the bridge portion 50z in the central member 50. The colored portion 154 can be embedded within the bridge portion 50z using film insert molding method or sheet insert molding method. Specifically, a light absorbing film is fixed inside a mold, and a thermoplastic resin having light transmissivity is injected into both of mold spaces partitioned by a light absorbing film to be solidified, to thus complete the central member 50 including the bridge portion 50z or the coupling portion 50d. Note that the arrangement and the like of the colored portion 154 illustrated in FIG. 15 are given as mere examples, and can be appropriately modified depending on the specifications of the light-guiding device 20, where the arrangement may also be separated at a plurality of locations, without being limited to a single location, to form a colored portion. The colored portion 154 can be formed in the exposed region AE, without being limited to the overlapped portion AO.

Sixth Embodiment

Figure 16:
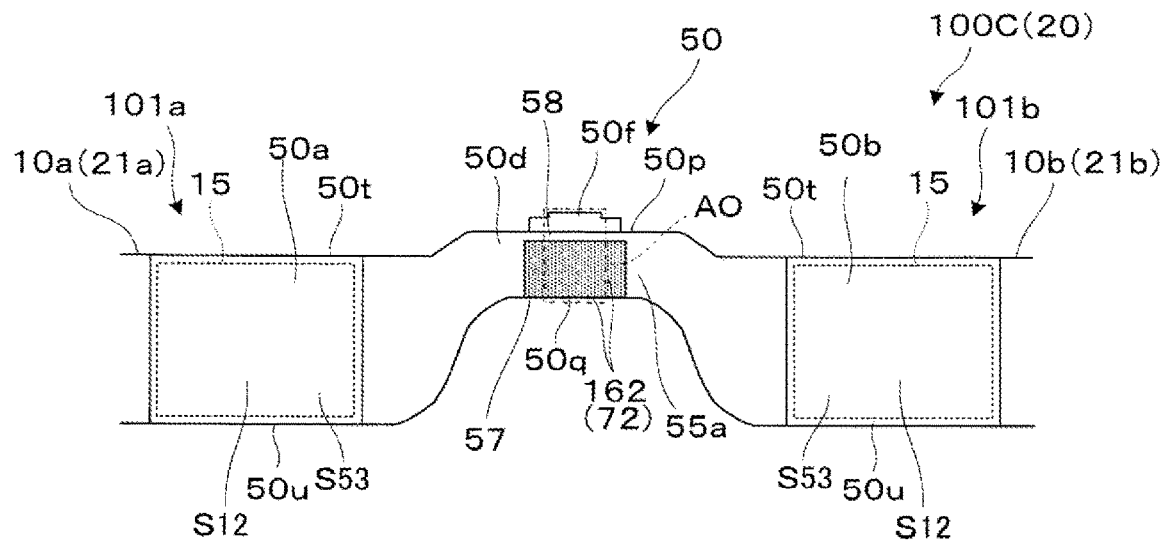
FIG. 16 is an explanatory front view partially illustrating a light-guiding device according to a sixth embodiment.

Hereinafter, a light-guiding device and a virtual image display apparatus according to the sixth embodiment will be described below with reference to FIG. 16. Note that the light-guiding device and the virtual image display apparatus according to the sixth embodiment are partially modified from the light-guiding device and the like according to the first and fourth embodiments, and descriptions on the common parts are omitted.

In case of the light-guiding device 20 illustrated in the figure, a surface absorption layer 162 is provided as the light-guide blocking structure 72, on the surfaces such as the front surface 55a, the lower surface 50q, and the like, at the bridge portion 50z in the central member 50. The surface absorption layer 162 is a layered colored portion that absorbs image light, and is integrated with a base material of the bridge portion 50z. The surface absorption layer (colored portion) 162 can be a surface layer integrated with the central member 50, using a sheet insert molding method, for example. Note that the arrangement and size of the colored portion 54 illustrated in FIG. 16 are given as mere examples, and can be appropriately modified depending on the specifications of the light-guiding device 20, where the arrangement may also be separated at a plurality of locations, without being limited to a single location, to form a colored portion. The surface absorption layer 162 can be formed in the exposed region AE, without being limited to the exposed region AE.

Seventh Embodiment

Hereinafter, a light-guiding device and a virtual image display apparatus according to the seventh embodiment will be described below with reference to FIGS. 17 and 18. Note that the light-guiding device and the virtual image display apparatus according to the seventh embodiment are partially modified from the light-guiding device and the like according to the first embodiment, and descriptions on the common parts are omitted.

Figure 17:
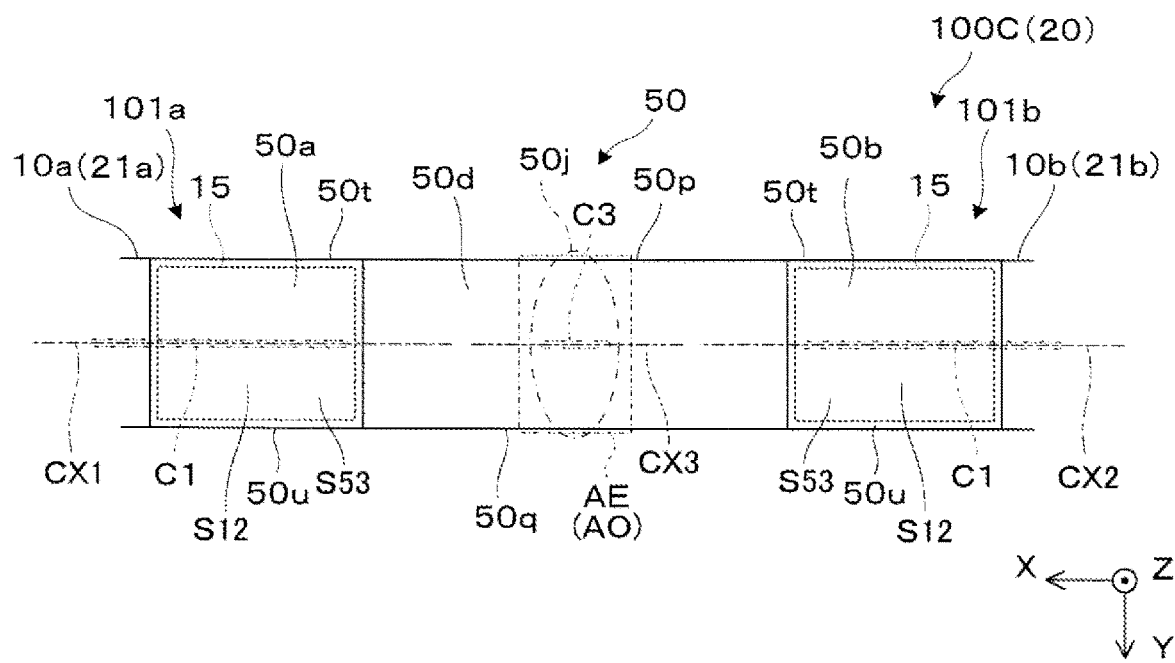
FIG. 17 is an explanatory front view partially illustrating a light-guiding device according to a seventh embodiment.

In case of the light-guiding device 20 illustrated in FIG. 17, the coupling portion 50d is devoid of the bridge portion 50z (see FIG. 5A) in the central member 50.

Figure 18:
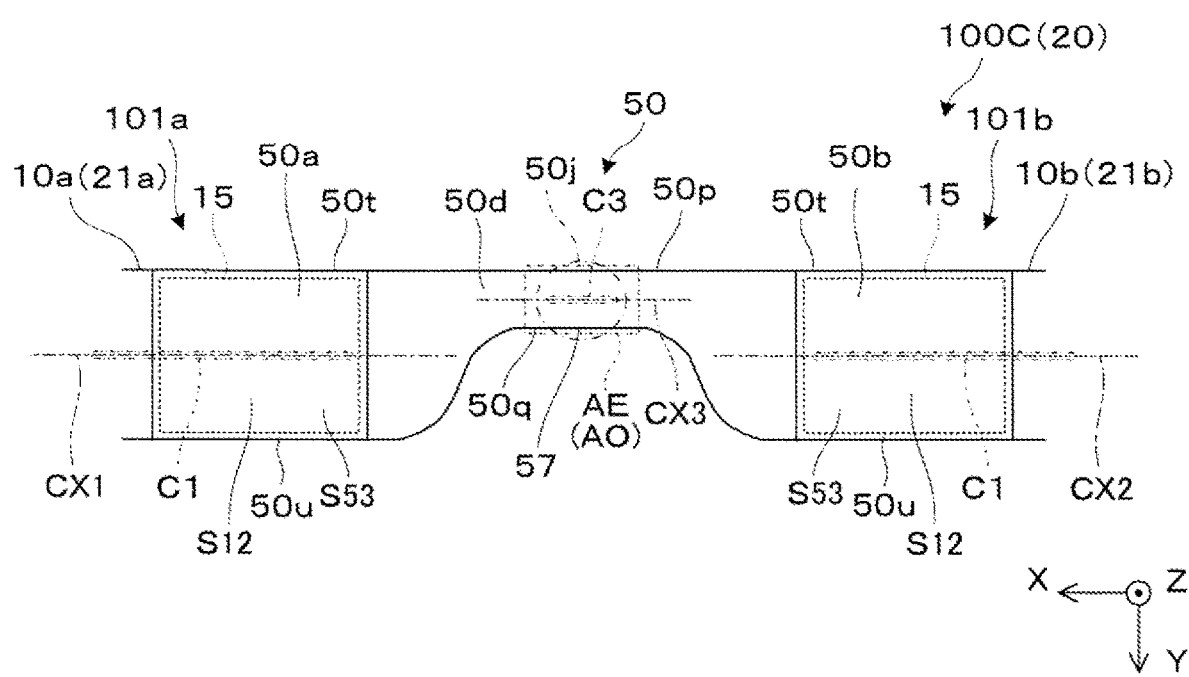
FIG. 18 is an explanatory front view partially illustrating a light-guiding device according to a seventh embodiment.

In case of the light-guiding device 20 illustrated in FIG. 18, only the notch 57 is provided at the coupling portion 50d of the central member 50 to omit the protrusion portion 58. Note that, although not illustrated in the figure, only the protrusion portion 58 may also be provided at the coupling portion 50d to omit the notch 57.

MODIFICATIONS AND OTHER PARTICULARS

In the first and fourth embodiments and the like described above, the base material JP is pulled up with being held substantially perpendicular to the coating solution, however, the base material JP may also be pulled up with being disposed at a large inclination relative to the coating solution CL. In this case, for example, the base material JP can be pulled up with height positions of the outward steps SA1 and SA2 from the coating solutions CL coinciding with each other, and the speeds at which the outward steps A1 and SA2 pass through the liquid surface can be reduced. This allows the pulling-up speed at the steps to be reduced, and the coating film CF of the coating solution CL to be thinner. In this case, an occurrence of liquid pooling is suppressed even if the steps are oriented inward.

In the embodiments described above, the coupling portion 50d of the central member 50 is shifted upward relative to the optical members 21a and 21b, however, the coupling portion 50d may be shifted toward the diagonally upper front side or the −Y+Z direction relative to the optical members 21a and 21b.

The central member 50 is sufficient to have light transmissivity in the pair of light transmissive portions 50a and 50b, and the entirety of the coupling portion 50d may be formed from a material devoid of light transmissivity.

The half mirror 15 may also be constituted by a volume hologram or the other hologram element, or may also be constituted by a diffraction grating.

In the virtual image display apparatus 100 in the above-described embodiments, a self-luminous display element such as an organic EL element is used as the image forming device 80. Instead, a configuration in which a laser scanner is configured by combining a laser light source with a scanner, such as a polygon mirror, may also be used as the image forming device 80.

In a specific aspect of the present disclosure, a first overcoat layer and a second overcoat layer corresponding to separate overcoat layers are spaced apart from each other at a center portion of a central member. In this case, a region where the base material is exposed can be formed at the center portion of the central member, to increase the degree of freedom of the subsequent processings.

In another specific aspect of the present disclosure, a positioning structure is provided at the center portion of the central member, and the first overcoat layer and the second overcoat layer are provided in a manner to avoid a positioning location of the positioning structure. In this case, finishing accuracy of the positioning location can be maintained in a simple manner.

In another specific aspect of the present disclosure, a surface scattering layer or a surface absorption layer is provided, at a surface of the central member, at a location where the first overcoat layer and the second overcoat layer are spaced apart from each other. This allows a light-guide blocking structure that suppresses an occurrence of ghost light to be incorporated.

In a specific aspect of the present disclosure, a first overcoat layer and a second overcoat layer corresponding to separate overcoat layers overlap at a center portion of the central member. In this case, the entirety of the central member can be protected by an overcoat.

In another specific aspect of the present disclosure, a coating thickness is relatively thick at a location where the first overcoat layer and the second overcoat layer overlap.

In another specific aspect of the present disclosure, a positioning structure is provided at a center portion of the central member, and an overlapped portion having a relatively large coating thickness due to an overlap between the first overcoat layer and the second overcoat layer is provided in a manner to avoid a positioning location of the positioning structure. In this case, the positioning location is covered by the first and second overcoat layers, and if the thicknesses of both the overcoat layers are approximately equal to each other and thin, positioning accuracies of the other components relative to the positioning structure can be prevented from being lowered.

In another specific aspect of the present disclosure, the overlapped portion has a lateral width narrower than a lateral width of the positioning structure. In this case, an arrangement in which overlapped portions avoid the positioning locations can be achieved in a simple manner.

In another specific aspect of the present disclosure, a colored portion formed by two-color molding is provided at an approximate center of the central member. This allows a light-guide blocking structure that suppresses an occurrence of ghost light to be incorporated. Then, the central member integrated with the light-guide blocking structure can be collectively fabricated.

In another specific aspect of the present disclosure, a colored portion is formed by sheet insert molding at an approximate center of the central member. This allows a light-guide blocking structure that suppresses an occurrence of ghost light to be incorporated. Then, the central member integrated with the light-guide blocking structure can be collectively fabricated.

In another specific aspect of the disclosure, a pair of optical members include outward steps provided in a concave shape at a tip end side away from the central member. At the time when a base material to which an optical member and a central member are joined is pulled up with a tip end side being oriented to a lower side, the outward step is in an overhanging state, suppressing an occurrence of a liquid pooling of coating solution.

In another specific aspect of the disclosure, a pair of optical members include outward steps at a front side and a back side. In this case, coating defects can be suppressed from occurring at the front and back outward steps.

In another specific aspect of the disclosure, a light-guiding device is the light-guiding device including a first optical member, a second optical member, and a central member having light transmissivity, in which the first optical member includes a first light-guiding portion, a first light-incident portion configured to cause image light to be incident on the first light-guiding portion, and a first light-emitting portion configured to cause the image light guided by the first light-guiding portion to exit outside, in which the second optical member includes a second light-guiding portion, a second light-incident portion configured to cause image light to be incident on the second light-guiding portion, and a second light-emitting portion configured to cause the image light guided by the second light-guiding portion to exit outside, in which the first optical member and the second optical member are coupled by the central member (having light transmissivity), and in which a first overcoat layer and a second overcoat layer are separately provided at the optical member on one side and at the optical member on another side relative to an approximate center of the central member.

In another specific aspect of the present disclosure, a virtual image display apparatus includes the above-described light-guiding device, and an image forming body configured to form image light that is to be guided to the light-guiding device, and guides image light reflected by a pair of half mirrors provided between a pair of optical members and the central member.

A method for manufacturing a light-guiding device according to an aspect of the present disclosure is the method for manufacturing a light-guiding device including a pair of light-guiding portions, a pair of light-incident portions configured to cause image light to be incident on the pair of light-guiding portions respectively, and a pair of light-emitting portions configured to emit image light, guided by thee pair of light-guiding portions, to outside respectively, in which separate overcoat layers are formed at an optical member on one side and at an optical member on another side relative to an approximate center of the central member.

What is claimed is:

1. A light-guiding device comprising:
   a first optical member that is covered with a first overcoat layer, the first optical member comprising:
      a first light-incident portion in which a first image light emitted from a first image forming device is incident; and
      a first light-emitting portion emitting the first image incident on the first light-incident portion;
   a second optical member that is covered with a second overcoat layer, the second optical member comprising:
      a second light-incident portion in which a second image light emitted from a second image forming device is incident; and
      a second light-emitting portion emitting the second image incident on the second light-incident portion; and
   a central member comprising:
      a first optical transmissive portion coupling with the first light-emitting portion of the first optical member and being covered with the first overcoat layer;
      a second optical transmissive portion coupling with the second light-emitting portion of the second optical member and being covered with the second overcoat layer; and
      a coupling portion coupling with each of the first optical transmissive portion and the second optical transmissive portion, wherein
   the coupling portion of the central member has a first region where the first overcoat layer overlaps with the second overcoat layer.

2. The light-guiding device according to claim 1, wherein in the central member, a coating thickness of the first region is thicker than a coating thickness of a second region where the first overcoat layer does not overlap with the second overcoat layer.

3. The light-guiding device according to claim 1, wherein the central member disposes a positioning structure at position different from the first region.

4. The light-guiding device according to claim 3, wherein a lateral width of the first region is narrower than a lateral width of the positioning structure.

5. The light-guiding device according to claim 1, wherein the central member includes a colored portion formed by two-color molding.

6. The light-guiding device according to claim 1, wherein the central member includes a colored portion formed by sheet insert molding.

7. The light-guiding device according to claim 1, wherein the first optical member and the second optical member include an outward step provided in a concave shape at a tip end side away from the central member, respectively.

8. The light-guiding device according to claim 7, wherein the first Optical member and the second optical member include the outward step at a front side and a back side, respectively.

* * * * *